(12) United States Patent
Irwin

(10) Patent No.: US 6,227,716 B1
(45) Date of Patent: May 8, 2001

(54) DIFFERENTIAL UNIT HAVING AN ADJUSTABLE BEARING ASSEMBLY

(76) Inventor: Earl J. Irwin, 12409 Burning Tree Rd., Ft. Wayne, IN (US) 46845

(*) Notice: Subject to any disclaimer, the term of this patent is extended or adjusted under 35 U.S.C. 154(b) by 0 days.

(21) Appl. No.: 09/377,869

(22) Filed: Aug. 20, 1999

(51) Int. Cl.[7] ............................................. F16C 25/06
(52) U.S. Cl. ....................................................... 384/583
(58) Field of Search .................... 384/519, 562, 384/583

(56) References Cited

U.S. PATENT DOCUMENTS

| | | | |
|---|---|---|---|
| 1,231,320 | 6/1917 | Alden | 384/583 |
| 1,339,991 | * 5/1920 | Utz | 384/583 |
| 1,506,365 | 8/1924 | Domizi | 475/246 |
| 1,614,992 | 1/1927 | Roberts | 475/246 |
| 2,016,343 | 10/1935 | Oberem | 475/246 |
| 2,133,112 | 10/1938 | Ormsby | 475/246 |
| 2,578,155 | 12/1951 | Slider | 475/246 |
| 2,651,216 | 9/1953 | Alden | 475/247 |
| 3,006,700 | 10/1961 | Hoffmann | 384/537 |
| 3,260,132 | 7/1966 | West et al. | 74/609 |
| 3,283,843 | 11/1966 | Runyan | 180/379 |
| 3,770,994 | * 11/1973 | Smith | 384/583 |
| 4,914,800 | 4/1990 | Cook | 29/434 |
| 5,269,731 | 12/1993 | Scudder et al. | 475/230 |

* cited by examiner

Primary Examiner—Thomas R. Hannon
(74) Attorney, Agent, or Firm—Liniak, Berenato, Longacre & White

(57) ABSTRACT

A vehicle differential unit including adjustable bearing assemblies has a differential carrier adapted to support a differential case assembly including differential case bearings associated therewith. The differential case bearing assemblies rotatably support the differential case assembly within the carrier of the differential unit. Adjusting rings are provided and supported internally in the differential carrier. The adjusting rings are selectively biased against the bearing assemblies to impart the desired bearing preload and backlash within the differential unit. The adjusting rings replace the use of adjustment shims, and are accessible to permit adjustment if necessary without the need to remove the differential case assembly. The adjusting rings are threadably supported on the carrier and the adjusting rings are further provided with internal splines sized to engage the axle shaft splines to provide an convenient and effective bearing adjustment of the differential unit.

15 Claims, 2 Drawing Sheets

DIFFERENTIAL UNIT HAVING AN ADJUSTABLE BEARING ASSEMBLY

BACKGROUND OF THE INVENTION a) Field of the Invention

The invention relates in general to automotive differential units having an adjustable differential carrier and bearing mounting assembly.

b) Description of Related Art

Differential units for automotive or similar uses are well-known in the prior art, and generally comprise a differential case rotatably mounted in a differential carrier by spaced bearing assemblies adapted to accurately center the differential case within the differential carrier and accurately position the ring gear relative to the drive pinion A problem has existed in such differential units with respect to the mounting of the bearings for the differential case or rotor so as to provide the desired amount of backlash between the pinion and ring gear of the differential gear assembly or to eliminate end play of the rotor. Proper engagement of the ring gear carried by the differential case with the driving pinion is necessary for proper operation, and subsequent wear of the gears or bearings will result in misadjustment of backlash, thereby requiring adjustment of the bearings. Generally, the prior art differential case bearings have been made adjustable by means of adjustment shims used to provide preload on the differential case bearings. In the use of such adjustment shims, it is often necessary to remove the differential case assembly to adjust backlash or bearing preload, which creates additional labor and adds cost to such an adjustment procedure.

There have been several attempts to provide differential units having adjustable bearing assemblies, but have heretofore been relatively complex. Such constructions have included various tools and gear assemblies to effect adjustment of a plurality of shims. Other constructions have been found to degrade the structural integrity and rigidity of the differential unit in association with the axles of the vehicle. It is generally necessary to provide adequate stiffness or rigidity for the bearing assemblies in the differential unit, especially under heavy load conditions.

Additionally, prior art bearing mounting assemblies which include an adjustment mechanism have generally resulted in a differential unit having increased costs associated with either the manufacture of the components or the assembly thereof

SUMMARY OF THE INVENTION

Based upon the foregoing, there has been found a need to provide a bearing mounting assembly associated with a differential unit which facilitates easy adjustment of the bearing assembly. It is therefore an object of the invention to provide an adjustable bearing assembly for a differential unit which overcomes the deficiencies of the prior art and permits adjustment of bearing preload and backlash within the differential unit without the use of adjustment shims.

In a preferred form, the differential unit comprises a differential carrier adapted to support a differential case assembly including differential case bearings associated therewith. The differential case bearing assemblies are rotatably supported on the differential case assembly relative to the carrier and gears of the differential unit. Adjusting rings are threadably engaged with and supported internally of the differential carrier. The differential case assembly is installed into the carrier. The adjusting rings are selectively biased against the bearing assemblies to impart the desired bearing preload and backlash within the differential unit. The adjusting rings replace the use of adjustment shims, and are accessible to permit adjustment if necessary without the need to remove the differential case assembly. The construction of the differential unit simplifies manufacturing and gives more rigidity so as to maintain proper engagement of the ring and pinion gears.

Notably, the axle shaft themselves are used to adjust the adjusting rings, whereby the axle shafts are installed to a depth that the shaft spline engages with an internal spline of the adjusting ring. Using a spanner wrench on shaft flanges, the gear position and bearing preload are adjusted by moving the adjusting ring(s). When the correct position is achieved, a lock pin is assembled into the carrier and through one of the holes of the adjusting ring. The bearing cap joints are torqued at this time to thereby provide a securely aligned assembly.

BRIEF DESCRIPTION OF THE DRAWINGS

The above and further objects and advantages of the invention will become apparent upon the further reading of the detailed description of the preferred embodiment of the invention, taken in conjunction with drawings, wherein.

DETAILED DESCRIPTION OF THE INVENTION

Figure 1:
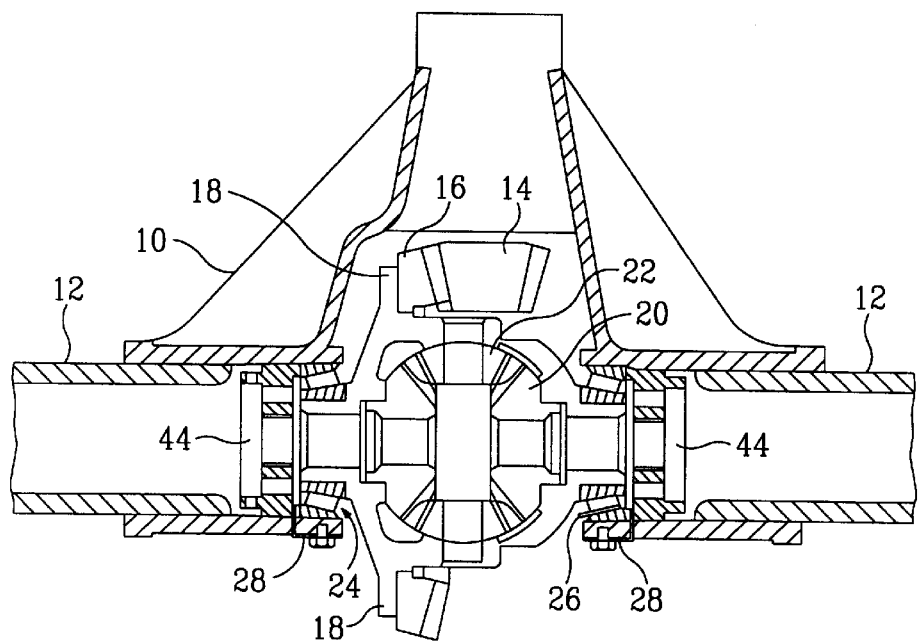
FIG. 1 is a partial cross-sectional view of a differential unit including the adjustable bearing assemblies of the invention.

Referring now to the drawings, and more specifically to FIG. 1, a vehicle different unit includes a differential housing 10, which is assembled so as to be connected to rear wheel axle tubes 12. The differential carrier 10 is adapted to be secured to the underside of the vehicle. Motive power is fed into the differential through a power input pinion 14, which is secured on the end of a drive shaft (not shown). The power input pinion gear 14 is adapted to mesh with a ring gear 16, which is secured to the periphery of a differential rotor or case 18. The ring gear 16, and the differential case 18 to which it is attached, are rotated in the stationary differential carrier 10 by means of the pinion gear 14. The rotary motion of the differential case 18 is imparted to the drive axles and wheels (not shown), wherein the drive axles are coupled to an output beveled gear set 20 which permit each of the drive axles to be driven at different speeds. The differential case assembly 18 is substantially of conventional construction, and also includes a plurality of planetary gears 22 adapted to mesh with the opposed output gears 20. Efficient operation of the differential depends upon the precise centering of the differential case assembly 18 in the differential carrier 10 for proper meshing engagement of the ring gear 16 with the pinion gear 14. To accomplish this, the differential case 18 is rotatably supported in the differential carrier 10 by means of infinitely adjustable bearing assemblies indicated generally at 24 and 26. The bearing assemblies 24 and 26 are preferably provided as pre-assembled anti-friction bearing units having associated bearing caps 28 adapted to be bolted to a bearing block the differential carrier 10.

Figure 2:
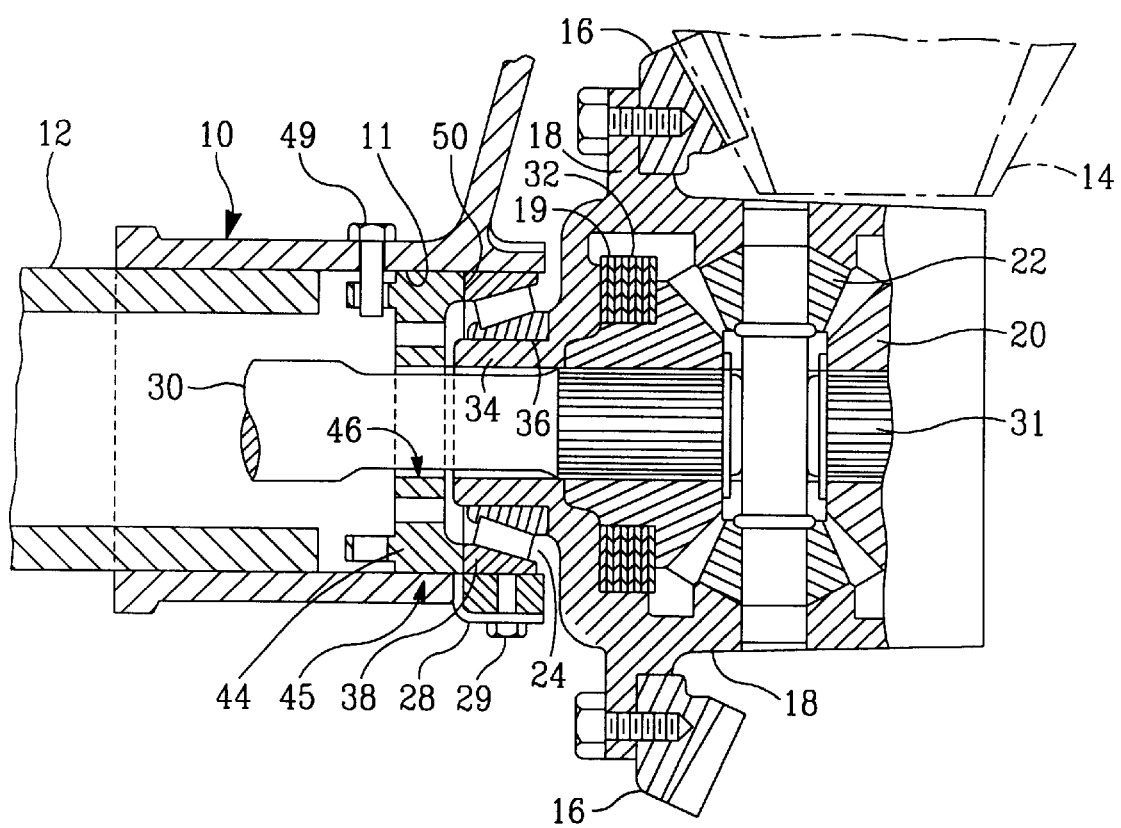
FIG. 2 is an enlarged partial cross-sectional view of one of the bearing assemblies in the differential units.

Turning to FIG. 2, one of the bearing assemblies of the invention is seen more distinctly. As seen in this figure, the plurality of planetary gears 22 respectively mesh with the opposed output gears 20, which are in turn secured to the axle shaft 30 disposed within axle tube 12. Interposed between each output gear 20 and an adjacent annular radial wall 19 of the differential case 20 is a limited slip clutch 32 of the conventional pre-loaded spring type, acting to minimize excessive slipping of one drive wheel relative to the other. The differential case 18 terminates at each lateral end with a cylindrical hub 34 adapted to be engaged by the inner race 36 of the pre-assembled anti-friction bearing unit 24. A tapered or wedge shaped outer bearing race 38 is supported by a semi-cylindrical bearing cap retainer 28.

Disposed adjacent to the rear wheel axle tube 12 is an adjusting ring 44. The adjusting ring 44 is provided with external threads 45, which are adapted to engage internal threads 11 formed on the carrier 10. The adjusting ring 44 further comprises internal splines 46 designed to mate with the splines 31 provided on the axle 30.

The adjusting ring 44 is threaded into the carrier 10. The differential case 18 and its differential assembly are then installed into the carrier 10. The bearing caps 28 and bolts 29 are then installed but not torqued. The axle shafts 30 are then installed to a depth that the shaft splines 31 mate with the internal splines 46 of the adjusting ring 44. Using a spanner wrench to engage axle shaft flanges (not shown), the ring gear position and bearing preload are adjusted by moving the adjusting rings 44. When the correct position is achieved, the lock pin 49 is assembled into the carrier and through one of the holes 47 in the periphery of the adjusting ring 44.

Using the axle shaft splines to adjusting bearing preload has been found to simplify manufacture of the differential unit. In the invention, the internal threading within the differential carrier 10 is easily performed, and the construction allows a hardened steel adjusting ring 44 to be used in association with the carrier 10. This simplifies manufacture and facilitates proper load bearing in the adjusting ring 44 to maintain the desired structural integrity. For adjustment, the adjusting ring 44 will be rotated so as to thread into or out of the carrier 10 for selective adjustment of its position relative to differential housing 10. The adjusting ring 44 includes an outer flange portion 48 having a contact surface 50 associated therewith, which is adapted to engage the tapered bearing race 38. The adjusting ring 44 therefore provides the load bearing structure supporting differential case 18 within carrier 10.

Figure 3:
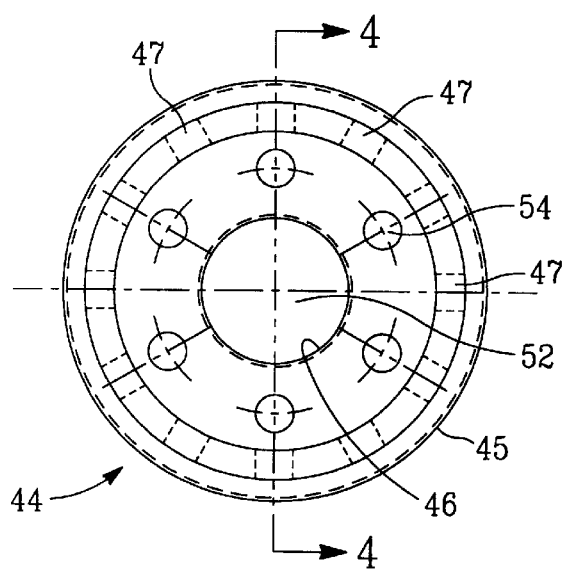
FIG. 3 shows a plan view of an adjusting ring to perform adjustment and locking of bearing preload and backlash characteristics in the differential unit.
Figure 4:
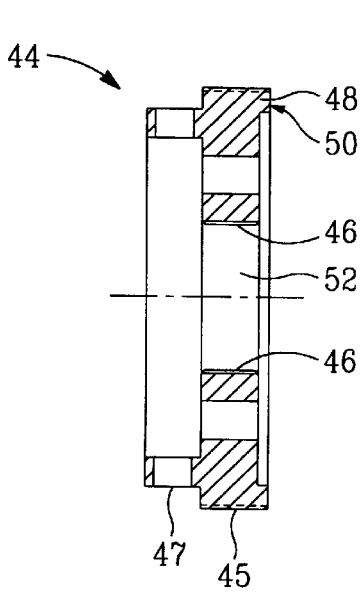
FIG. 4 shows a cross-sectional view taken along the line 4—4 of FIG. 3.

The adjusting ring 44 is shown more distinctly in FIGS. 3 and 4, wherein it is seen that ring 44 is a cylindrical member having a center aperture 52 through which a vehicle drive axle extends. The threaded external surface 45 provides the engagement surface for securing the adjusting ring 44 to the interior of carrier 10 as previously described.

Through a combination of casting and machining tolerances, it will be unlikely that the axial location of the differential rotor or case 18 will be properly positioned, and various problems will thus be encountered. Upon engagement of the bearing retaining cap 28 to seat the bearing assemblies, end play of the differential case 18 within the differential housing 10 will be observed along with possibly inaccurate axial positioning of the differential case resulting in improper engagement of the ring gear 16 with the pinion gear 14. For this reason, each anti-friction bearing assembly 24 and 26 of the differential unit may be adjustable to permit proper centering, and the application of a preselected preload on the differential case bearings. The bearing assemblies will also permit adjustment if necessary when preloading forces start to drop due to wear. Although in the preferred embodiment, both bearing assemblies 24 and 26 will be adjustable by means of an adjusting ring 44 and associated structure, adjustment may be provided for only one of the bearing assemblies 24 and 26 if desired.

By means of the contact surface 50 of adjusting ring 44, the location of the tapered bearing race 38 is infinitely adjustable so as to provide the desired bearing preload and backlash in the differential unit. It is also seen in FIG. 3, that the adjusting ring 44 includes a plurality of lightening holes or oil apertures 54 provided therein, which reduce the weight of the adjusting rings 44 and permit oils to flow to and from the bearings 24, 26 and axles 30. Further, the adjusting ring 44 includes a plurality of apertures 47 (12 shown in FIG.3) to allow adjustment and locking of the adjustment ring 44 in the desired position. The apertures 47 are spaced to allow any desired incremental change in the position of adjustment ring 44.

It should be evident that upon threading of adjusting ring 44 outwardly from the axle tube 12 into the carrier 10, additional loading force is imparted to the outer bearing race 38. The tapered design of bearing race 38 essentially provides a ramp upon which the bearings of the assembly are carried. Upon the inward urging of the tapered bearing race 38, adjustment of the differential case bearing preload and backlash can be achieved. The inner race 36 of the bearing assemblies 24 and 26 is pressed onto a reduced end portion of the differential case 18 and against a thrust shoulder such that the bearing assembly will carry the thrust loads of the differential case in a single direction. The adjusting ring 44 will in turn carry the thrust load placed upon the bearing assembly to a great extent. As the internal threaded engagement of the adjusting ring 44 within carrier 10 allows hardened steel parts to be used, these loads are better accommodated in this construction. It should be understood that the differential case bearing assembly at the opposite end of the differential case 18 as seen in FIG. 2, is identical to the bearing assembly as described, except that it will be reversed to carry a thrust load in the opposite direction as desired. By proper positioning of the bearing assemblies in the differential unit, end play between the differential case 18 and differential carrier 10 will be eliminated, and the differential case 18 may be centered in the carrier 10 for proper engagement of the ring gear 16 with pinion gear 14 during assembly of the differential case 18 to differential carrier 10.

In the assembly operation, drive axles 30 of the vehicle are installed to an adjustment depth wherein the external splines 31 of the shaft 30, normally designed to engage the side gears 20 during operation, engage internal splines 46 of the adjusting ring 44. The adjusting rings 44 are initially fully retracted along the carrier 10 on both sides of the differential unit, to allow assembly of the differential case 18 within the differential carrier 10. The differential case assembly 18 is placed in the carrier 10 with the tapered differential case bearings assembled on both sides thereof. The bearing caps 28 are then mounted and the bolts 29 are installed, but not completely tightened, to seat the bearing assemblies between differential case 18 and carrier 10. The adjusting ring 44 may then be rotated so as to be tightened against the anti-friction bearing assembly 24 on the ring gear 16 side of the differential case assembly 18, until there is no backlash between the pinion gear 14 and ring gear 16. The opposite adjusting ring 44 will then be tightened against the opposite differential case bearing assembly until the required backlash between pinion gear 14 and ring gear 16 is achieved. The bearing caps 28 may then be tightened to the required torque to maintain the centered position of differential case assembly 18 relative to differential carrier 10. After proper positioning and centering of the differential case assembly, the bearing caps 28 are fully torqued and the locking bolt 49 is installed into the carrier 10 through the appropriate aperture 47 of the adjusting ring 44. At this point, adjustment of the bearing preload and backlash is effected, and end play between the differential case assembly 18 and differential carrier 10 is eliminated. Proper meshing of the pinion gear 14 with ring gear 16 will allow maximum transmission of rotary motive power to the drive axles and wheels of the vehicle.

An advantage of the differential unit construction including the adjustable bearing assemblies is found in the ability to adjust the preload on the bearing assemblies without removal of the differential case assembly 18. For example, if backlash increases due to wear of the pinion gear 14 or ring gear 16, the preloading force on the differential case bearings is also reduced and requires adjustment for proper functioning of the differential. To accomplish such adjustment, the locking bolt or pin 49 is removed and the axle shafts 30 are withdrawn to an intermediate position causing engagement of the axle shaft splines 31 with the internal splines 46 of the adjusting ring 44. By rotating the axle shaft 30, the adjusting ring 44 opposite the ring gear 16 may then be loosened slightly by rotating the adjustment ring 44 through the threaded engagement with the carrier 10. The adjusting ring 44 on the ring gear 16 side of the differential case assembly 18 may then be tightened against the bearing assembly 24 of the differential case assembly. Such adjustment is continued until there is no backlash between the pinion gear 14 and ring gear 16 similar to initial assembly of the differential case assembly 18 with the differential carrier 10. The opposed adjusting ring 44 associated with bearing assembly 26 may then be tightened against the bearing assembly until the required backlash between pinion gear 14 and ring gear 16 is achieved. The bearing caps 28 may then be tightened to the required torque and the locking pin 49 replaced in their interengaging position with an aperture 47 of the adjusting rings 44.

From the foregoing description, it should be apparent that the invention permits rapid, convenient and accurate mounting of the differential case assembly of a vehicle differential unit in the proper axial position relative to the differential housing so as to eliminate end play of the differential case assembly and impart the desired bearing preload in the differential unit. In this way, proper intermeshing engagement of the ring gear carried by the differential case assembly with the power input pinion gear may be effected while introducing the desired amount of backlash between these gears. The construction of the invention allows adjustment of the bearing preload and backlash without removal of the differential case assembly, so as to greatly simplify initial as well as subsequent adjustments of the bearing assemblies.

Although only one preferred embodiment has been shown and described herein, various modifications or alternative embodiments not specifically mentioned herein are contemplated and would be recognized by those skilled in the art. Therefore, the invention is only to be limited by the scope of the invention as defined in the appended claims.

What is claimed is:

1. A combination bearing assembly and bearing adjustment ring for adjusting a position of said bearing assembly with respect to a housing along an axial direction, said combination comprising:

an inner race and an outer race forming a bearing assembly;

an adjustment ring comprising,
an annular body having an outer surface and an inner circumference, said inner circumference defining a central aperture sized to receive a rotating shaft;
external screw threads formed on said outer surface for matingly engaging internal screw threads formed on said housing;
a keyway formed on said inner circumference; and
an abutment surface facing said axial direction and engaging said outer race,
wherein said keyway is adapted to mate with an adjustment tool inserted into said central aperture to thereby permit adjustment of a position of said outer race via rotation of said adjustment ring along said internal and external screw threads.

2. The combination of claim 1, where in said keyway comprises a series of splines.

3. The combination of claim 1, further comprising a locking means disposed on said adjustment ring to lock said adjustment ring relative to said housing and to prevent rotation of said adjusting ring from a preselected relative position with respect to said outer race.

4. The combination of claim 3, wherein said locking means comprises a series of apertures formed in said outer surface and a lock pin extending into at least one of said apertures to allow incremental adjustment of a bearing preload, wherein adjustment of said bearing preload is effected by removal of said locking means making said adjusting ring accessible and adjustable from the exterior of said housing to allow the position of said adjusting ring to be varied with respect to said outer race.

5. The combination of claim 1, further comprising a plurality of axially extending apertures formed in said annular body, said apertures reducing a weight of said adjustment ring and providing a passageway for lubrication of said bearing assembly.

6. The combination of claim 1, wherein said adjustment tool comprises a shaft formed with said external splines.

7. A vehicle differential unit comprising, a differential housing having a differential case assembly mounted within said housing, said differential housing supporting at least a pair of axially spaced differential case anti-friction bearing assemblies which rotatably support and center said differential case assembly within the differential housing;

said differential housing further including a threaded interior surface thereof adjacent at least one of said bearing assemblies;

each of said bearing assemblies having an inner bearing race mounted in association with said differential case, and an outer bearing race supported on said housing;

at least one adjusting ring for adjustment of bearing preload, said at least one adjusting ring positioned within said housing, said adjusting ring comprising an external circumferential surface formed with external screw threads, an internal circumferential surface defining a central aperture, and a radially extending contact surface acting on said outer bearing race, said external screw threads matingly engaging said threaded interior surface of said differential housing, a series of internal splines formed on said internal circumferential surface; and a locking means associated with said differential housing to selectively lock said at least one adjusting ring and to prevent rotation of said adjusting ring from a preselected relative position with respect to said outer bearing race.

8. The vehicle differential unit of claim 7, wherein said adjusting ring includes a plurality of apertures formed therein which are spaced from one another, with said locking means extending through said differential housing into at least one of said apertures to allow incremental adjustment of bearing preload, wherein adjustment of bearing preload is effected by removal of said locking means making said adjusting ring accessible and adjustable from the exterior of said differential carrier to allow the position of said adjusting ring to be varied with respect to said outer bearing race.

9. The differential unit of claim 7, wherein said differential unit includes a ring gear concentrically mounted on said differential case assembly so as to be engaged by a drive pinion gear, with the position of differential case assembly being determined by the relative positions of each of the differential case bearing assemblies, and engagement of said ring gear and pinion gear being adjusted by selectively positioning each of said adjusting rings relative to said bearing assemblies to result in predetermined backlash between said ring gear and said pinion gear.

10. The differential unit of claim 7, wherein said contact surface provided on said at least one adjusting ring is formed on an outwardly extending flange, with said contact surface formed at the outer peripheral edge of said flange for engagement with an end face of said tapered outer bearing race.

11. The differential unit of claim 7, wherein said adjusting ring is accessible from the exterior of said differential case assembly, such that adjustment by rotation of said adjusting ring may be effected without removal of said differential case assembly.

12. A vehicle differential unit comprising:
a differential housing having a differential case assembly mounted within said housing, said differential housing supporting at least a pair of axially spaced differential case anti-friction bearing assemblies which rotatably support and center said differential case assembly within the differential housing;
said differential housing further including a threaded interior surface thereof adjacent at least one of said bearing assemblies;
each of said bearing assemblies having an inner bearing race mounted in association with said differential case, and an outer bearing race supported on said housing;
at least one adjusting ring for adjustment of bearing preload, said at least one adjusting ring positioned within said housing, said adjusting ring comprising an external circumferential surface formed with external screw threads, an internal circumferential surface defining a central aperture, and a radially extending contact surface acting on said outer bearing race, said external screw threads matingly engaging said threaded interior surface of said differential housing;
a locking means associated with said differential housing to selectively lock said at least one adjusting ring and to prevent rotation of said adjusting ring from a preselected relative position with respect to said outer bearing race; and
at least one axle shaft having external splines formed thereon, wherein said external splines are sized to selectively mate with either of said internal splines of said adjusting ring and a separate set of internal splines formed on a side gear disposed within said differential case.

13. A method of adjusting a differential bearing assembly comprising the steps of:
threading an adjusting ring onto threads formed on a differential carrier;
installing a differential case and a differential assembly into the carrier;
inserting an adjustment tool to a depth that external splines formed on said adjustment tool mate with internal splines formed on the adjusting ring;
adjusting a bearing preload by rotating said adjustment tool;
locking said adjusting ring in fixed position relative to said differential carrier.

14. The method according to claim 13, wherein said adjustment tool comprises an axle shaft driven by said differential assembly.

15. The method according to claim 13, wherein said step of locking comprises inserting a locking pin through said carrier and into an aperture formed on said adjusting ring.

* * * * *